(12) United States Patent
Howell et al.

(10) Patent No.: US 6,239,969 B1
(45) Date of Patent: May 29, 2001

(54) COMPUTER DOCKING GUIDANCE SYSTEM

(75) Inventors: Bryan Howell; Damon Broder; Orin Ozias, all of Austin, TX (US); Peter Skillman, San Carlos; Robert Gregory Twiss, Portola Valley, both of CA (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/128,044

(22) Filed: Aug. 3, 1998

(51) Int. Cl.$^7$ ................................ G06F 1/16; H05K 7/14
(52) U.S. Cl. .................................................... 361/686
(58) Field of Search ................................ 361/686, 683; 312/223.1, 223.2

(56) References Cited

U.S. PATENT DOCUMENTS

| 5,339,213 | 8/1994 | O' Callaghan . |
| 5,396,400 | 3/1995 | Register et al. . |
| 5,402,310 | 3/1995 | Penniman . |
| 5,452,180 | 9/1995 | Register et al. . |
| 5,465,038 | 11/1995 | Register . |
| 5,477,415 | 12/1995 | Mitcham et al. . |
| 5,526,493 | 6/1996 | Shu . |
| 5,552,959 | 9/1996 | Penniman et al. . |
| 5,568,359 | 10/1996 | Cavello et al. . |
| 5,579,528 | 11/1996 | Register . |
| 5,699,226 | 12/1997 | Cavello . |
| 5,818,691 | 10/1998 | McMahan et al. . |
| 5,822,185 | 10/1998 | Cavello . |
| 6,072,695 | * 6/2000 | Steiger et al. ........................ 361/686 |

* cited by examiner

Primary Examiner—Lynn D. Feild
(74) Attorney, Agent, or Firm—Haynes and Boone, L.L.P

(57) ABSTRACT

A docking apparatus for docking selected portable computers which provides coarse and medium alignment between the docking connector of the computer system and the docking connector of a docking station mounted on a docking tray by providing rails having oppositely facing upright flat faces on a docking tray and notches formed in the underside of the chassis, the notches having corresponding oppositely facing upright flat faces and opposing sloping sidewalls for urging the flat face of the rails toward the flat faces of the notches. The notches are preferably wider at the leading edge of the chassis, away from the connector than at the trailing edge, close to the chassis and the rails are preferably spaced further apart at the leading edge of the tray than they are close to the docking station. Coarse alignment followed by finer alignment is accomplished by providing a closer spacing between the rails as they get closer to the docking station and by providing notches which are narrower closer to the docking station than away from the docking station.

31 Claims, 2 Drawing Sheets

COMPUTER DOCKING GUIDANCE SYSTEM

BACKGROUND

The disclosures herein relate generally to docking alignment or guidance in a portable computer system and more particularly to providing an alignment tray and computer base features which cooperate to facilitate proper alignment of a portable computer with a docking station or port replicator for interconnection.

Port replicators and docking stations are docking devices which attach to the back of a portable notebook computer via a single docking connector. Docking devices have several other connectors which remain connected to various cables, e.g. printer, power, video, etc. In this manner, a notebook computer can pass standard I/O signals to peripheral devices via the docking device without the need to make all of the cable connections directly to the notebook computer. Thus, the user of the notebook computer can quickly engage and disengage the notebook computer from the docking device.

There are various methods of interconnecting notebook computers with port replicators and docking stations. Some models merely plug in. Others include mechanical alignment features adjacent the docking station's docking connector and the computer's mating connector to provide fine alignment between the connectors prior to completing the plug connection. All of the interconnection methods require the user to put the notebook computer's docking connector in some level of alignment with the port replicator or docking station as a first step in making the interconnection, defeating to some extent the purpose of the docking station of making it quick and easy to engage and disengage the notebook computer from a group of peripherals.

Docking trays having upright sidewalls spaced to closely retain the upright sidewalls of a notebook computer have been used to assist the user in aligning the docking connectors. This approach requires that each notebook computer have a specifically designed docking tray, and require the user to carefully position the chassis in the tray before mating the computer and docking station connectors. To enable a docking station and docking tray to be used with various sizes of notebooks, and for backward and forward compatibility of notebooks and docking trays, trays having moveable or replaceable sidewalls have been proposed. These add yet another step to the process of docking a particular notebook computer again detracting from the goal of providing quick and easy engagement of the notebook computer with peripherals. In addition, adjustable sidewalls require that the customer fix the sidewalls in the proper position for the docking connector on the notebook computer to properly align with the connector on the docking station or port replicator. Misalignment can make it difficult to make the required connection and can cause damage to the electronic connectors. In addition, this approach increases the number of parts and mechanical complexity and durability, as well as manufacturing costs of such docking trays.

Technology updates also require manufacturers to reconfigure chassis and connectors. Minimizing the complexity and number of design changes in chassis and docking trays is important for manufacturing cost efficiency. Small tolerances in manufactured parts lead to higher costs. However, the cumulative effect of parts produced near the tolerance limits can lead to a misfit between a particular mass-produced alignment tray and a particular mass-produced computer chassis. That misfit can lead to a portable computer that is not stable when connected to its docking station or, at worst, cannot be connected because the connectors cannot be aligned.

Consumers also want and need to be able to very easily, quickly, and reliably connect their portable computers to their docking stations in such a way that the docked computer is stable and without mechanically stressing the electrical connectors.

Accordingly, what is needed is a docking alignment system that quickly and easily guides the portable computer into alignment for mechanical and electrical connection with a docking station or port replicator, which can accommodate a wide variety of computer chassis designs without any user adjustment of the parts of the system and which does not require close manufacturing tolerances.

SUMMARY

One embodiment, accordingly, provides an apparatus and method for alignment of a portable computer with a docking connector, which method and apparatus is capable of accommodating various sizes and configurations of portable computer chassis and which enhances the ease with which the user can connect the computer to a docking station or port replicator. To this end, the docking alignment system includes a pair of spaced apart guide rails mounted on or integrally formed in a docking tray and a portable computer chassis having corresponding notches in the underside of the chassis for guiding the computer toward and into alignment with its docking connectors. The rails each have oppositely facing upright flat faces and the notches include oppositely facing flat walls that slidingly engage one another as the computer chassis is moved from a position adjacent the end of the docking tray, over the tray, and toward the docking wall of the docking station. To stabilize the computer when docked and at rest on the docking tray, each rail includes a small protrusion or wedge on its flat face spaced along the rail some distance from the docking wall.

A principal advantage of this embodiment is that the guide rail and notch sizing and placement need not be altered to accommodate a change in computer chassis size, peripheral connection port locations or sizes or other configuration changes to the computer chassis.

DETAILED DESCRIPTION

Figure 1:
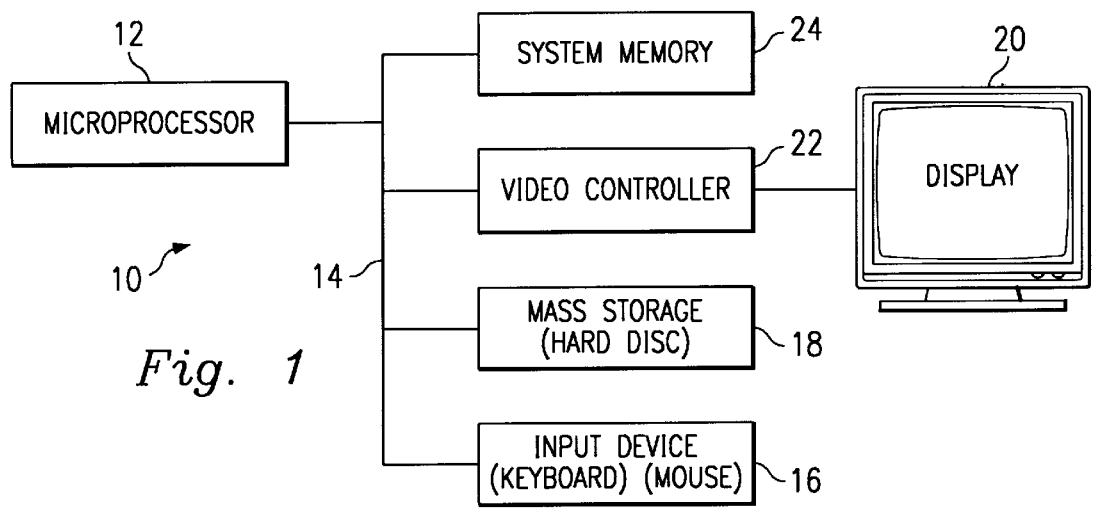
FIG. 1 is a diagrammatic view illustrating an embodiment of a computer system.

Referring to FIG. 1, a portable computer system 10 is illustrated which includes a microprocessor 12 which is connected to a bus 14. The bus 14 serves as a connection between the microprocessor 12 and other components of the computer system 10. An input device 16 is coupled to the microprocessor 12 to provide input to the microprocessor 12. Examples of input devices include keyboards, touch screens, and pointing devices such as mouses, trackballs and trackpads. Programs and data are stored on a mass storage device 18 which is coupled to the microprocessor 12. Mass storage devices include such devices as hard disks, optical disks, magneto-optical drives, floppy drives and the like. The computer system 10 further includes a display 20 which is coupled to the microprocessor 12 by a video controller 22. A system memory 24 is coupled to the microprocessor 12 to provide the microprocessor with fast storage to facilitate execution of computer programs by the microprocessor 12. It should be understood that other busses and intermediate circuits can be deployed between the components described above and the microprocessor 12 to facilitate interconnection between the components and the microprocessor.

Figure 2:
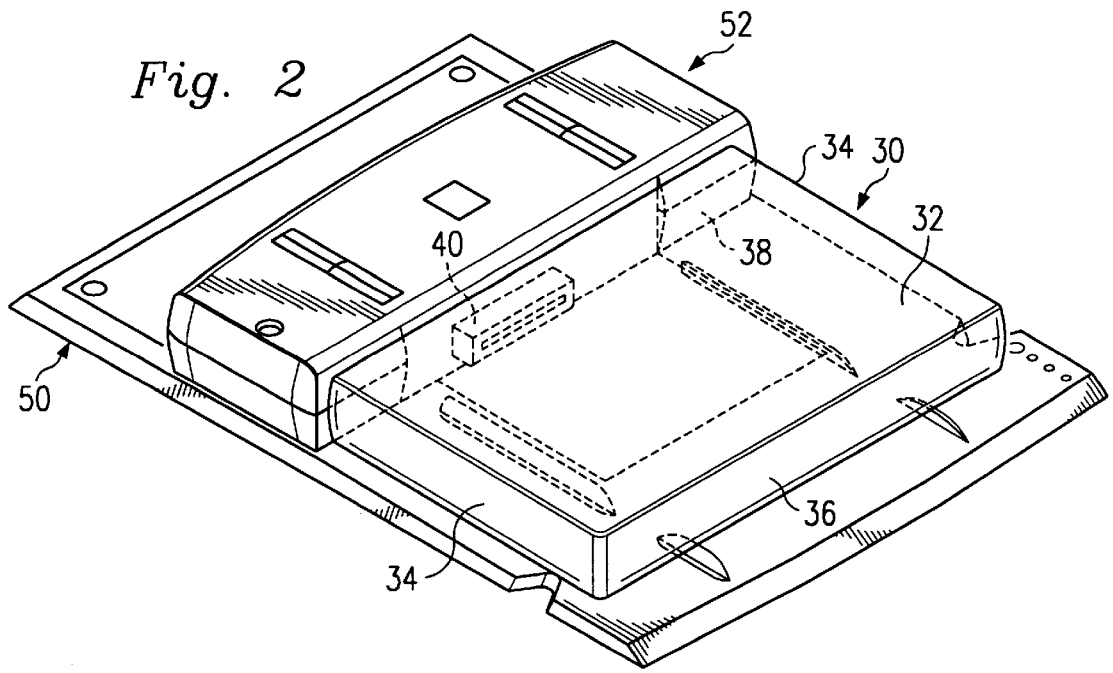
FIG. 2 is an isometric view of a portable computer in its docked position after it has been aligned in accordance with the embodiment.
Figure 3:
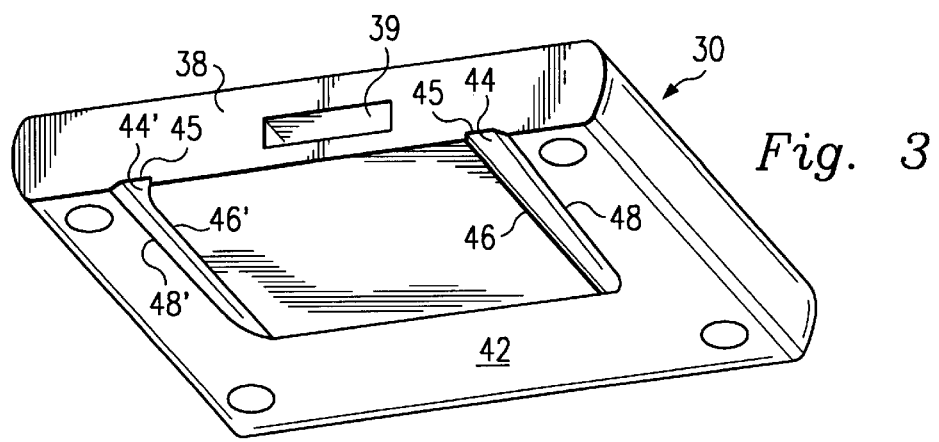
FIG. 3 is an isometric view of the underside of the portable computer alignment notches portion of the alignment apparatus.

With reference to FIGS. 2 and 3, the computer system 10 is contained in a chassis 30 which includes a top wall 32 which is hinged to be opened to expose the display 20 and the input devices 16. The chassis further includes opposing sidewalls 34, a front wall 36, and a back wall 38. The back wall 38 includes an opening 39 for a well known docking connector (not shown). As best shown in FIG. 3, the bottom wall or base 42 of the chassis 30 includes a pair of spaced apart, elongated guiding notches 44 and 44', each extending away from the back wall 38. The notches 44 and 44' include upright sidewalls 46 and 46' respectively, which sidewalls extend throughout the length of the notches. The notches 44 and 44' further include a flat base wall 45 and opposing walls 48 and 48' respectively, the opposing walls being gently sloped up to the level of the base 42. The notches 44 and 44' are spaced apart to function as receivers for guiding rails on a docking tray, as will be further described below. The notches 44 and 44' are preferably widest adjacent the back wall 38, and narrow down as they get closer to the front wall 36.

A docking tray 50 is provided for use with the computer system 10 and is configured to cooperate with the chassis 30, and in particular with the guiding notches 44 and 44' in the chassis base 42, to guide the computer system 10 into alignment with a port replicator or docking station 52 for mechanical and electrical connection between the computer system docking connector and an also well known mating docking station connector 40 (illustrated in dashed lines in FIG. 2). The docking station 52 can be fixed to or removably mountable on the docking tray 50 in any conventional manner.

Figure 4:
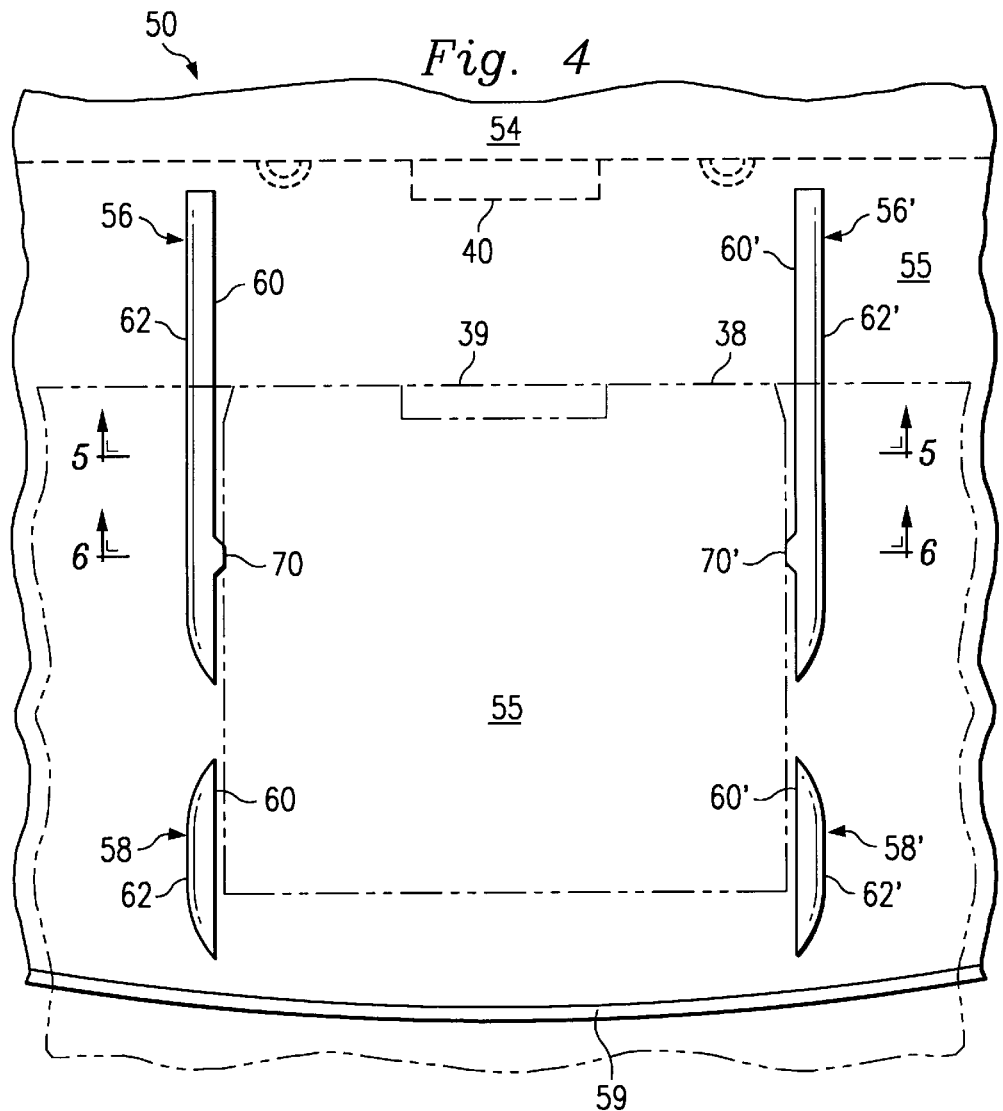
FIG. 4 is a plan view of the docking tray alignment rails with the portable computer shown in dashed lines being positioned in an intermediate position on the tray.

As best shown in FIGS. 2 and 4, the docking tray 50 preferably includes a docking station section 54 which forms a base pad for the docking station 52. The tray 50 also includes an alignment section 55 which provides a base pad for sliding the portable computer system 10 into alignment with the docking station 52. The alignment section 55 includes a first pair of spaced apart and generally parallel long rails 56 and 56' located adjacent to the docking station section 54, and a second pair of spaced apart and generally parallel short rails 58 and 58' located close to an entrance edge 59 of the alignment section 55.

Figure 5:
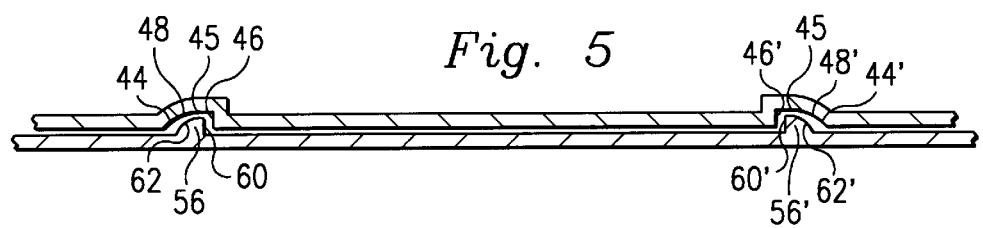
FIG. 5 is a partial cross sectional view taken along line 5—5 of FIG. 4.
Figure 6:
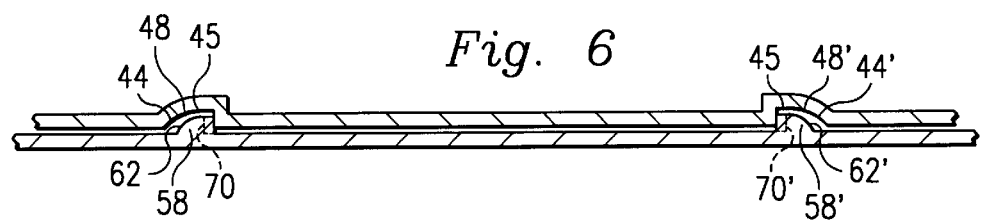
FIG. 6 is a partial cross sectional view taken along line 6—6 of FIG. 4.

As best shown in FIGS. 5 and 6, the long rails 56 and 56' and each of the short rails 58 and 58' respectively have inner, upright, facing flat faces 60 and 60' respectively and opposing, gently sloped arcuate faces 62 and 62' respectively. The pair of short rails 58 and 58' are spaced further apart than the long rails 56 and 56'. This spacing feature provides a dual alignment function. When the chassis 30 is placed on the tray 50, close to the entrance edge 59, the leading short rails 58 and 58' respectively easily fall within the wide area of the notches 44 and 44' respectively. Then, as the chassis base 42 slides on the tray 50 toward the docking station 52, as shown in FIG. 4, the more closely spaced long rails 56 and 56' provide a finer alignment as they fall into the notches 44 and 44' respectively. In particular, the notches' sloping outward faces 48 and 48' urge the rails' facing flat faces 60 and 60' respectively toward the notches' upright sidewalls 46 and 46' respectively. In this way, as the computer system 10 contained within its chassis 30 is moved along the alignment section 55 of the docking tray 50 toward the docking station 52, the short rails 58 and 58' provide first stage, coarse alignment between with the docking connector 40 and the chassis opening 39, and then the closer spaced long rails 56 and 56' provide a second stage of closer alignment with the docking connector 40.

It has been found that adding a small protrusion or wedge 70 some distance from the back wall 38 of the chassis 30 to the otherwise flat face of the rails prevents the chassis from rocking when the keyboard or other input device 16 is being used while the computer is docked. For this reason, a pair of such anti-rocking wedges 70 (shown in FIGS. 4 and 6) are formed on the inner flat faces 60 and 60' of each of the long rails 56 and 56' respectively. By placing the wedges 70 a distance away from the back wall 38 of the chassis 30 and keeping them relatively small, the wedges 70 do not significantly interfere with the ability to make fine alignment adjustments of the chassis opening 39 relative to the docking connector 40 that may be needed to effect the necessary electrical connection between the computer system 10 and the docking station 52. At the same time, the wedges 70 provide the desired level of stability against chassis rocking when the docked computer is in use.

As illustrated in FIG. 5, the width of the guiding notches 44 and 44' respectively is preferably greater than the width of the rails 56, 56' respectively and 58 and 58' respectively by a factor of 2 or 3 to allow for relatively wide latitude in the initial placement of the computer on the docking tray as well as the ability to move the chassis 30 laterally once it is in close proximity to the docking station 52. This latitude accommodates the variations in positions of the connectors on each of the computer system 10 and the docking station 52. This latitude does not interfere with the coarse and medium alignment accomplished by the guidance system because the flat facing walls of the rails and notches keep the computer moving on track toward the docking wall and its docking port by limiting lateral movement of the chassis beyond the upright walls of the rails, as will be further explained below.

It has been found that rails anywhere from about 3 mm to about 7 mm high, and notches anywhere from about 2 mm to about 3 mm deep, are adequate to keep the rails within the notches 44 and 44' under the weight of a typical notebook computer as it is pushed along the docking tray 50. Spacing between the rails or between the notches is largely a function of the design of the underside of a particular notebook computer and of the relative locations of the docking station on the docking tray, the docking port relative to the docking station, and the docking connector relative to other dimensions of the notebook. As can be appreciated, the spacing between notches and the differences between notch and rail widths should be sufficient to accommodate the accumulated tolerances among all of these positioned parts of the computer docking station system.

To provide a coarse and then medium alignment, the notches preferably are wider at the back of the chassis base and narrower toward the front edge. The width of the notches can be anywhere from about 1 to about 4 times the width of the rails. By sloping the outer edge of the notches and rounding off the outer edge of the rails, tolerances and friction forces can be controlled. In addition, the slope and rounding of the notch and rails helps to direct the notebook to slide toward abutment of the respective flat faces of the rails and notches.

The rails and notches should be long enough to maintain alignment control over the length of the tray. Splitting the rails into two pairs of rails as shown and described is a convenient way to provide that control and at the same time make a transition from coarse alignment to medium alignment by providing a wider spacing between the pair of rails closer to the entry end of the tray than those closer to the connector end. A single pair of rails having a wider spacing sloping to a narrower spacing could also be used.

In operation, the computer system 10 is placed with its chassis back wall 38, or leading edge, close to or over the entrance edge 59 of the docking tray 50 and then pushed toward the docking station 52. As the computer system 10 is moved toward the docking station 52 on the alignment section 55 of the docking tray 50, the sloping walls 48 and 48' of the notches 44 and 44' respectively will urge the flat faces 60 and 60' of the rails 58 and 58' respectively toward the corresponding upright sidewalls 46 and 46' of the notches 44 and 44' respectively and into an appropriate level of alignment for the docking connection to be made. The guidance system is particularly useful with docking connectors that include a mechanical alignment feature associated with the electrical docking connectors. An example of such a feature is disclosed in commonly assigned U.S. Pat. No. 5,699,226 to Cavello.

As can now be appreciated, one advantage of this embodiment is the ease with which a user can generally place the computer system chassis 30 on the docking tray 50, without much regard for positioning. Then, simply sliding the chassis 30 toward the docking station 52 will effectively align the docking connector 40 on the port replicator or docking station 52 with the chassis opening 39, leaving only the fine alignment required for making the connection. In this way, the guidance system does not interfere with making the connection because it does not unduly constrain fine adjustment of the position of the docking connector 40 relative to a mating connector mounted within the opening 39.

Another advantage is the ability of the alignment system to accommodate a broad range of manufacturing tolerances in both the docking tray 50 and the computer chassis 30. A further advantage is that the alignment system is not dependent on the width or length of the computer chassis 30 and is particularly suitable for standardization. By providing notches in the chassis base with a standard separation and length regardless of chassis size or configuration, a single docking tray can be used for alignment with all of those chassis bases. Moreover, if spacing or length do have to be changed, the cost for retooling to make that minor change is minimal compared to retooling for more complex tray designs.

A further advantage follows from designing the tray features to accomplish only a medium level of alignment. The tray will not cause misalignment between the docking station connector and the computer system connector, but in fact will assist making a connection even when the computer chassis and docking station chassis are manufactured and/or assembled at the outer limits of their tolerances.

Although an illustrative embodiment has been shown and described, a wide range of modification, change and substitution is contemplated in the foregoing disclosure. For example, although the described embodiment has rails on the tray and notches on the base of the computer chassis, they could be reversed, with the rails on the computer chassis base and notches on the tray. The notch and rail configurations could each be turned inside out. In other words, although the described embodiment had notches with inwardly facing upright sidewalls and the rails outwardly facing flat faces, this could be reversed so that the notches had outwardly facing upright sidewalls and the rails inwardly facing flat faces. In addition, in some instances, some features of the described embodiment may be employed without a corresponding use of other features. Accordingly, it is appropriate that the appended claims be construed broadly and in a manner consistent with the scope of the embodiment disclosed herein.

What is claimed is:

1. A guiding and aligning system comprising:
   a computer including a chassis having a base wall and opposing front and rear walls extending from the base wall, wherein the rear wall includes an opening for exposing a docking connector;
   a docking station having a docking connector for mating with the computer's docking connector, the mating connector being mounted in a docking wall of the docking station;
   a docking tray providing a surface for sliding the chassis toward the docking station and providing a support surface for the chassis when the portable computer is docked, the docking tray including an entrance end for initially receiving the chassis rear wall and a docking end for locating the docking wall of the docking station;
   a pair of spaced apart rails having oppositely facing flat faces, the rails being positioned longitudinally between the entrance end and the docking end of the docking tray;
   a pair of notches in the chassis base wall, the notches extending longitudinally from the rear wall toward the front wall of the chassis wherein the notches each include a sloping sidewall and an upright sidewall, the sloping sidewalls receiving the rails and urging the flat faces of the rails toward the upright sidewalls of the notches; and
   each notch includes a flat base wall between the sloping sidewall and the upright sidewall and wherein the sloping sidewall is a gradually curving sidewall.

2. The system of claim 1 wherein each rail has an arcuate surface extending from the terminal end of the flat face to the docking tray surface.

3. The system of claim 1 further comprising a protrusion extending outwardly from each of the flat faces of the rails wherein the protrusion is positioned a sufficient distance from the computer's docking connector to prevent the portable computer from rocking on the docking tray when docked.

4. The system of claim 1 wherein the spacing between the rails is greater adjacent the docking station docking wall than adjacent the entrance end of the tray.

5. The system of claim 1 wherein the pair of rails is a first pair of rails having their flat faces substantially equally spaced a predetermined distance from a center line of the docking tray and further comprising a second pair of rails longitudinally spaced from the first pair, the second pair having oppositely facing flat faces spaced a larger predetermined distance from the center line of the docking tray than the predetermined distance between the flat faces of the first pair of rails.

6. The system of claim 1 wherein each notch includes an open end and a closed end and the closed end is spaced from the rear wall of the chassis.

7. A guiding and aligning system comprising:
a computer including a chassis having a base wall and opposing front and rear walls extending from the base wall, wherein the rear wall includes an opening for exposing a docking connector;
a docking station having a docking connector for mating with the computer's docking connector, the mating connector being mounted in a docking wall of the docking station;
a docking tray providing a surface for sliding the chassis toward the docking station and providing a support surface for the chassis when the portable computer is docked, the docking tray including an entrance end for initially receiving the chassis rear wall and a docking end for locating the docking wall of the docking station;
a pair of spaced apart rails having oppositely facing flat faces, the rails being positioned longitudinally between the entrance end and the docking end of the docking tray;
a pair of notches in the chassis base wall, the notches extending longitudinally from the rear wall toward the front wall of the chassis wherein the notches each include a sloping sidewall and an upright sidewall defining a gap there-between, the sloping sidewalls receiving the rails and urging the flat faces of the rails toward the upright sidewalls of the notches;
each notch includes an open end and a closed end and the closed end is spaced from the rear wall of the chassis; and
the gap between the sidewalls of each of the notches gradually narrows between the open end and the closed end of the notch.

8. A guiding and aligning system comprising:
a computer including a chassis having a base wall and opposing front and rear walls extending from the base wall, wherein the rear wall includes an opening for exposing a docking connector;
a docking station having a docking connector for mating with the computer's docking connector, the mating connector mounted in a docking wall of the docking station;
a docking tray providing a surface for sliding the chassis toward the docking station and providing a support surface for the chassis when the portable computer is docked, the docking tray including an entrance end for initially receiving the chassis rear wall and a docking end for locating the docking wall of the docking station;
a pair of spaced apart rails having oppositely facing flat faces extending outwardly from the chassis base wall, the rails being longitudinally positioned between the front and the rear walls of the chassis;
a pair of notches extending from the entrance end of the docking tray toward the docking end of the docking tray, wherein the notches each include a sloping sidewall and an upright sidewall, the sloping sidewalls receiving the rails and urging the flat faces of the rails toward the upright sidewalls of the notches; and
each notch includes a flat base wall between the sloping sidewall and the upright sidewall and wherein the sloping sidewall is a gradually curving sidewall.

9. The system of claim 8 wherein each rail has an arcuate surface extending from the terminal end of the flat face to the docking tray surface.

10. The system of claim 8 further comprising a protrusion extending outwardly from each of the flat faces of the rails wherein the protrusion is positioned a sufficient distance from the docking connector of the computer chassis to prevent the portable computer from rocking on the docking tray when docked.

11. The system of claim 9 wherein the spacing between the rails is greater adjacent the docking station docking wall than adjacent the entrance end of the tray.

12. The system of claim 9 wherein the pair of rails is a first pair of rails having their flat faces substantially equally spaced a predetermined distance from a center line of the docking tray and further comprising a second pair of rails longitudinally spaced from the first pair, the second pair having oppositely facing flat faces spaced a larger predetermined distance from the center line of the docking tray than the predetermined distance between the flat faces of the first pair of rails.

13. The system of claim 9 wherein each notch includes an open end and a closed end and the closed end is spaced from the rear wall of the chassis.

14. A guiding and aligning system comprising:
a computer including a chassis having a base wall and opposing front and rear walls extending from the base wall, wherein the rear wall includes an opening for exposing a docking connector;
a docking station having a docking connector for mating with the computer's docking connector, the mating connector mounted in a docking wall of the docking station;
a docking tray providing a surface for sliding the chassis toward the docking station and providing a support surface for the chassis when the portable computer is docked, the docking tray including an entrance end for initially receiving the chassis rear wall and a docking end for locating the docking wall of the docking station;
a pair of spaced apart rails having oppositely facing flat faces extending outwardly from the chassis base wall, the rails being longitudinally positioned between the front and the rear walls of the chassis;
a pair of notches extending from the entrance end of the docking tray toward the docking end of the docking tray, wherein the notches each include a sloping sidewall and an upright sidewall defining a gap therebetween, the sloping sidewalls receiving the rails and urging the flat faces of the rails toward the upright sidewalls of the notches;
each notch includes an open end and a closed end and the closed end is spaced from the rear wall of the chassis; and
the gap between the sidewalls of each of the notches gradually narrows between the open end and closed end of the notch.

15. A docking guidance system for aligning a portable computer with a docking station, wherein the portable computer includes a computer docking connector and the docking station includes a mating docking connector mounted in a docking wall of the docking station, the docking guidance system comprising:
a chassis for containing the portable computer and having a base wall and opposing front and rear walls extending from the base wall, wherein the chassis rear wall includes an opening for the portable computer docking connector;

a docking tray providing a surface for sliding the chassis toward the docking station and providing a support surface for the chassis when the portable computer is docked, the docking tray including an entrance end for initially receiving the chassis rear wall and a docking end for locating the docking wall of the docking station;

a pair of spaced apart rails having oppositely facing flat faces, the rails being positioned longitudinally between the entrance end and the docking end of the docking tray;

a pair of notches in the chassis base wall, the notches extending longitudinally from the rear wall toward the front wall of the chassis wherein the notches each include a sloping sidewall and an upright sidewall, the sloping sidewalls receiving the rails and urging the flat faces of the rails toward the upright sidewalls of the notches; and each notch includes a flat base wall between the sloping sidewall and the upright sidewall and wherein the sloping sidewall is a gradually curving sidewall.

16. The docking guidance system of claim 15 wherein each rail has an arcuate surface extending from the terminal end of the flat face to the docking tray surface.

17. The docking guidance system of claim 15 further comprising a protrusion extending outwardly from each of the flat faces of the rails wherein the protrusion is positioned a sufficient distance from the docking station wall to prevent the portable computer from rocking on the docking tray when docked.

18. The docking guidance system of claim 15 wherein the spacing between the rails is greater adjacent the docking station docking wall than adjacent the entrance end of the tray.

19. The docking guidance system of claim 15 wherein the pair of rails is a first pair of rails having their flat faces substantially equally spaced a predetermined distance from a center line of the docking tray and further comprising a second pair of rails longitudinally spaced from the first pair, the second pair having oppositely facing flat faces spaced a larger predetermined distance from the center line of the docking tray than the predetermined distance between the flat faces of the first pair of rails.

20. The docking guidance system of claim 15 wherein each notch includes an open end and a closed end and the closed end is spaced from the rear wall of the chassis.

21. A docking guidance system for aligning a portable computer with a docking station, wherein the portable computer includes a computer docking connector and the docking station includes a mating docking connector mounted in a docking wall of the docking station, the docking guidance system comprising:

a chassis for containing the portable computer and having a base wall and opposing front and rear walls extending from the base wall, wherein the chassis rear wall includes an opening for the portable computer docking connector;

a docking tray providing a surface for sliding the chassis toward the docking station and providing a support surface for the chassis when the portable computer is docked, the docking tray including an entrance end for initially receiving the chassis rear wall and a docking end for locating the docking wall of the docking station;

a pair of spaced apart rails having oppositely facing flat faces, the rails being positioned longitudinally between the entrance end and the docking end of the docking tray;

a pair of notches in the chassis base wall, the notches extending longitudinally from the rear wall toward the front wall of the chassis wherein the notches each include a sloping sidewall and an upright sidewall defining a gap therebetween, the sloping sidewalls receiving the rails and urging the flat faces of the rails toward the upright sidewalls of the notches;

each notch includes an open end and a closed end and the closed end is spaced from the rear wall of the chassis; and the gap between the sidewalls of each of the notches gradually narrows between the open end and closed end of the notch.

22. A docking guidance system for aligning a portable computer with a docking station, wherein the portable computer includes a computer docking connector and the docking station includes a mating docking connector mounted in a docking wall of the docking station, the docking guidance system comprising:

a chassis for containing the portable computer and having a base wall and opposing front and rear walls extending from the base wall, wherein the chassis rear wall includes an opening for the portable computer docking connector;

a docking tray providing a surface for sliding the chassis toward the docking station and providing a support surface for the chassis when the portable computer is docked, the docking tray including an entrance end for initially receiving the chassis rear wall and a docking end for locating the docking wall of the docking station;

a pair of spaced apart rails having oppositely facing flat faces extending outwardly from the chassis base wall, the rails being longitudinally positioned between the front and the rear walls of the chassis;

a pair of notches extending from the entrance end of the docking tray toward the docking end of the docking tray, wherein the notches each include a sloping sidewall and an upright sidewall, the sloping sidewalls receiving the rails and urging the flat faces of the rails toward the upright sidewalls of the notches; and each notch includes a flat base wall between the sloping sidewall and the upright sidewall and wherein the sloping sidewall is a gradually curving sidewall.

23. The docking guidance system of claim 22 wherein each rail has an arcuate surface extending from the terminal end of the flat face to the chassis base wall.

24. The docking guidance system of claim 22 further comprising a protrusion extending outwardly from each of the flat faces of the rails wherein the protrusion is positioned a sufficient distance from the chassis opening for the computer docking connector to prevent the portable computer from rocking on the docking tray when docked.

25. The docking guidance system of claim 22 wherein the spacing between the rails is greater adjacent the rear wall of the chassis than adjacent the front wall of the chassis.

26. The docking guidance system of claim 22 wherein the pair of rails is a first pair of rails having its flat faces substantially equally spaced a predetermined distance from a center line of the chassis and further comprising a second pair of rails longitudinally spaced from the first pair, the second pair having oppositely facing flat faces spaced a larger predetermined distance from the center line of the chassis than the predetermined distance between the flat faces of the first pair of rails.

27. The docking guidance system of claim 22 wherein each notch includes an open end and a closed end and the closed end is spaced from the docking station docking wall.

28. A docking guidance system for aligning a portable computer with a docking station, wherein the portable computer includes a computer docking connector and the docking station includes a mating docking connector mounted in a docking wall of the docking station, the docking guidance system comprising:
- a chassis for containing the portable computer and having a base wall and opposing front and rear walls extending from the base wall, wherein the chassis rear wall includes an opening for the portable computer docking connector;
- a docking tray providing a surface for sliding the chassis toward the docking station and providing a support surface for the chassis when the portable computer is docked, the docking tray including an entrance end for initially receiving the chassis rear wall and a docking end for locating the docking wall of the docking station;
- a pair of spaced apart rails having oppositely facing flat faces extending outwardly from the chassis base wall, the rails being longitudinally positioned between the front and the rear walls of the chassis;
- a pair of notches extending from the entrance end of the docking tray toward the docking end of the docking tray, wherein the notches each include a sloping sidewall and an upright sidewall defining a gap therebetween, the sloping sidewalls receiving the rails and urging the flat faces of the rails toward the upright sidewalls of the notches;
- each notch includes an open end and a closed end and the closed end is spaced from the docking station docking wall; and
- the gap between the sidewalls of each of the notches gradually narrows between the open end and closed end of the notch.

29. A method of aligning a portable computer mounted in a computer chassis and having a docking connector mounted in a chassis docking wall with a docking station having a mating docking connector in a docking wall of the docking station, comprising the steps of:
- providing a docking tray for the portable computer;
- forming a pair of laterally spaced rails on the docking tray between an entrance end and a docking end of the docking tray, each rail having an oppositely facing flat face extending outwardly from the surface of the docking tray and also having an arcuate wall extending from the flat face to the surface of the docking tray;
- forming a pair of corresponding notches in the underside of the portable computer chassis, extending from the chassis docking wall toward the opposing wall of the chassis, the notches having an open first end and a terminal end, each notch including a flat sidewall and an opposing, sloping sidewall defining a gap therebetween, the spacing between the sidewalls being greater adjacent the chassis docking wall than adjacent the opposing chassis wall;
- placing the portable computer on the docking tray with the notches in overlying relationship to the rails and with the chassis docking wall space from the docking station docking wall;
- sliding the computer on the tray toward the docking station docking wall; and
- providing the gap which gradually narrows between the open end and the terminal end of each notch.

30. The method of claim 29 further comprising the step of forming a protrusion on each of the flat faces of each of the rails a sufficient distance from the docking wall of the docking station to prevent the chassis from rocking on the docking tray when the portable computer is used in its docked condition.

31. A computer system comprising:
- a computer including a chassis having a base wall and opposing front and rear walls extending from the base wall, wherein the rear wall includes an opening for exposing a docking connector;
- a microprocessor mounted in the chassis;
- a input coupled to provide input to the microprocessor;
- a storage coupled to the microprocessor;
- a video controller coupled to the microprocessor;
- a memory coupled to provide storage to facilitate the execution of computer programs by the microprocessor;
- a docking station having a docking connector for mating with the computer's docking connector, the mating connector being mounted in a docking wall of the docking station;
- a docking tray providing a surface for sliding the chassis toward the docking station and providing a support surface for the chassis when the portable computer is docked, the docking tray including an entrance end for initially receiving the chassis rear wall and a docking end for locating the docking wall of the docking station;
- a pair of spaced apart rails having oppositely facing flat faces, the rails being positioned longitudinally between the entrance end and the docking end of the docking tray;
- a pair of notches in the chassis base wall, the notches extending longitudinally from the rear wall toward the front wall of the chassis wherein the notches each include a sloping sidewall and an upright sidewall defining a gap therebetween, the sloping sidewalls receiving the rails and urging the flat faces of the rails toward the upright sidewalls of the notches;
- each notch includes an open end and a closed end and the closed end is spaced from the rear wall of the chassis; and
- the gap between the sidewalls of each of the notches gradually narrows between the open end and closed end of the notch.

* * * * *